(No Model.)
C. H. NOBLET.
ROLLER FOR CLOD CRUSHERS OR PULVERIZERS.
No. 483,007. Patented Sept. 20, 1892.
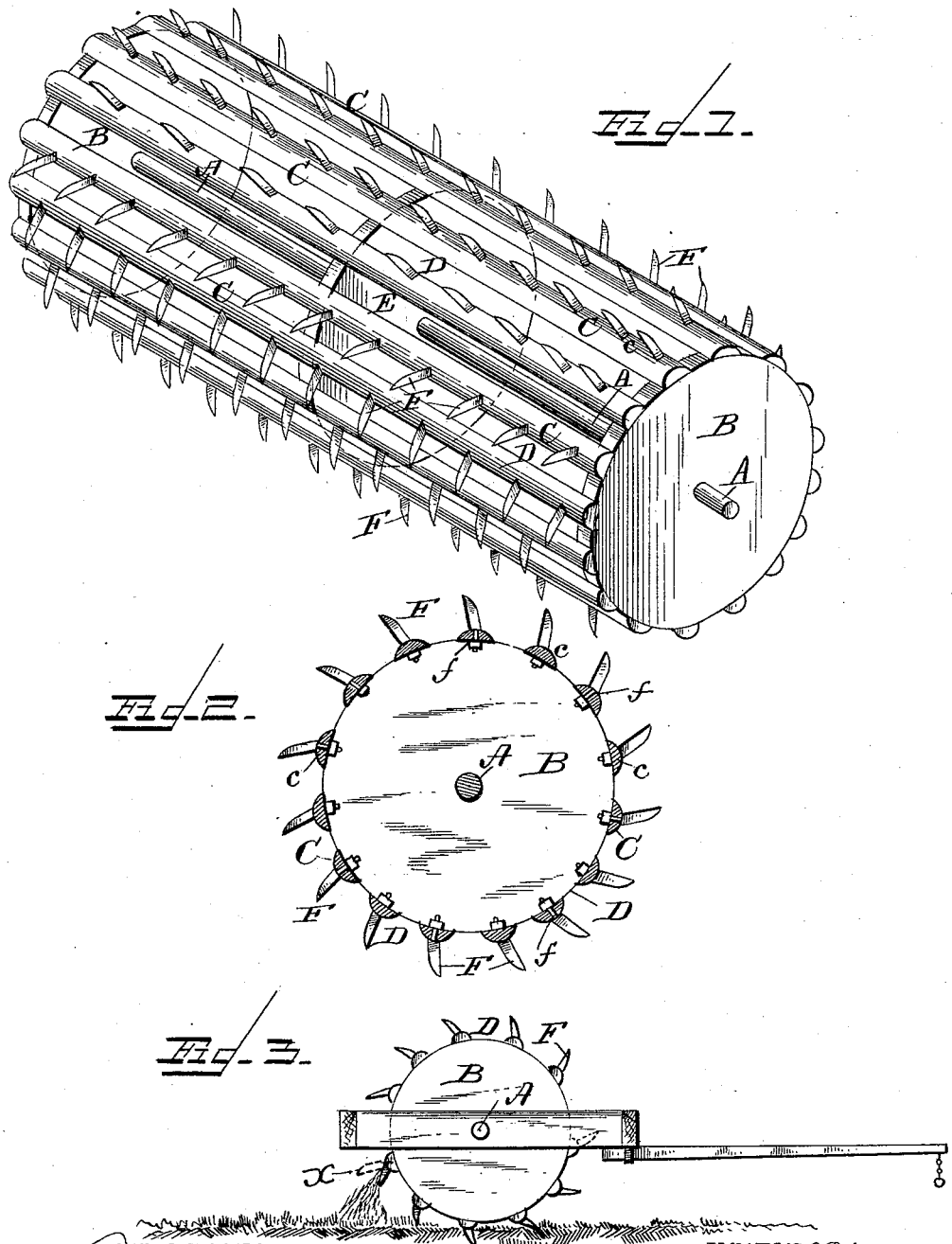

UNITED STATES PATENT OFFICE.

CHARLES H. NOBLET, OF BUCYRUS, OHIO, ASSIGNOR OF ONE-HALF TO HENRY ALBRIGHT, OF SAME PLACE.

ROLLER FOR CLOD CRUSHERS OR PULVERIZERS.

SPECIFICATION forming part of Letters Patent No. 483,007, dated September 20, 1892.

Application filed January 30, 1892. Serial No. 419,808. (No model.)

*To all whom it may concern:*

Be it known that I, CHARLES H. NOBLET, a citizen of the United States, and a resident of Bucyrus, in the county of Crawford and State of Ohio, have invented certain new and useful Improvements in Rollers for Clod Crushers or Pulverizers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved roller. Fig. 2 is a cross-section of the same at right angles to the axle, and Fig. 3 is a side elevation showing the operation of the slanting knives in conjunction with the convex knife bars or bearings.

Like letters of reference denote corresponding parts in all the figures.

This invention relates to clod crushers and pulverizers, and has for its object to so construct a land-roller that it shall be practically self-cleaning and self-clearing. When operating on clayey and soggy soil, especially after rain, the soil is apt to clog up the roller by filling up the spaces between the pulverizing teeth or knives, thus to a certain extent rendering these useless and necessitating frequent stoppages to clear the roller of accumulated soil. By the peculiar construction of my roller this drawback is entirely obviated and I produce a practically self-cleaning roller, which will not only clean itself of soil or clay, however sticky it may be, but which will clear its teeth or knives of all grass or rubbish, and thus do continuous and efficient service under all conditions and circumstances and regardless of the nature of the soil operated upon.

Referring to the accompanying drawings, the letter A designates the axle, and B B the circular heads or ends of my improved roller. These ends are connected by parallel longitudinal bars C, convexed on their outer face, so as to form a swell or bulge c. The open spaces D between the bars approximate in width the width of the bars themselves, and the bars are supported between opposite ends to prevent bending or sagging by one or more circular disks E, corresponding in diameter to the heads or end disks B. The bars C are drilled through, so as to present series of holes f for the insertion of the shanks of the clearing and pulverizing teeth F, which are held in place by nuts G, screwed upon the shanks against the flat under side of the perforated bars. It will be observed that the teeth or cutters F are fastened upon the bars in a slanting position—*i. e.,* slanting or inclined backward. This is a very important point, as that arrangement of the teeth enables them to clear themselves of the grass and rubbish on the ground instead of picking it up and carrying it around with the roller. This feature will be understood on reference to Fig. 3, from which it will be seen that the angle at which the teeth are inclined rearwardly is such that as the teeth rise from the ground during the revolutions of the roller they are lifted up or withdrawn from the ground in a straight line (somewhat on the principle and after the manner of a so-called "feathering" paddle-wheel) instead of dragging the grass and trash up with them. To better illustrate and explain this, I have indicated by dotted lines in Fig. 3 the position of a tooth projecting in a straight line or at right angles from the roller, and it will be seen that as this tooth (marked X) is lifted up from the ground as the roller revolves it has a tendency to lift up and carry with it grass and rubbish on the ground which will become entangled with the teeth and interfere with the proper operation of the roller. This serious drawback I avoid by placing the sharp-edged teeth or knives F at the proper angle, so that they will recede from the ground perpendicularly or in a straight line. By making the outer surfaces of the bars C convex the soil will not adhere to them, but will slip off easily, breaking up and dropping by its gravity through the open spaces between the bars. This roller may be used either singly, as represented in Fig. 1, or two or more may be mounted in a frame, so as to form a "gang," which may be used with or without a harrow attachment, as desired.

In am aware that the open frame or skeleton rollers are not new in clod crushing and pulverizing devices; but I am not aware that a skeleton roller has been made before with convex knife-bars and rearwardly-slanting knives.

What I claim as new, therefore, and desire to secure by Letters Patent of the United States, is—

In a clod crusher or pulverizer, the combination, with the axle A, the solid heads or disks B B, and the intermediate disk E, of the parallel bars C, convexed on their outer faces, forming a swell or bulge c, and the backwardly-slanting teeth or knives F, secured to said bars at an angle to the axis of the heads or disks B B, substantially as and for the purpose described.

In testimony that I claim the foregoing as my own I have hereunto affixed my signature in presence of two witnesses.

CHARLES H. NOBLET.

Witnesses:
S. R. HARRIS,
WM. T. MCDONALD.